United States Patent
Hwang et al.

(10) Patent No.: US 8,970,517 B2
(45) Date of Patent: Mar. 3, 2015

(54) DISPLAY DEVICE HAVING TOUCH SCREEN PANEL THAT OFFSETS INDUCTION VOLTAGE INDUCED IN COMMON ELECTRODE

(75) Inventors: Intak Hwang, Daegu (KR); Namkyun Cho, Gumi (KR)

(73) Assignee: LG Display Co., Ltd., Seoul (KR)

( * ) Notice: Subject to any disclaimer, the term of this patent is extended or adjusted under 35 U.S.C. 154(b) by 135 days.

(21) Appl. No.: 13/248,282

(22) Filed: Sep. 29, 2011

(65) Prior Publication Data
US 2012/0081320 A1    Apr. 5, 2012

(30) Foreign Application Priority Data
Oct. 1, 2010  (KR) .......................... 10-2010-0096105

(51) Int. Cl.
G06F 3/041    (2006.01)
G06F 3/044    (2006.01)

(52) U.S. Cl.
CPC .............. G06F 3/044 (2013.01); G06F 3/0412 (2013.01); G06F 3/0418 (2013.01)
USPC .......................... 345/173; 345/174; 178/18.06

(58) Field of Classification Search
CPC ....... G06F 3/041; G06F 3/044; G06F 3/0416; G06F 3/0418; G06F 3/0412; G06F 2203/04107; G09G 3/36
USPC ................. 345/173–178, 156, 104, 207, 212; 324/679, 629; 178/18.02; 327/517
See application file for complete search history.

(56) References Cited

U.S. PATENT DOCUMENTS

| | | | | |
|---|---|---|---|---|
| 5,631,666 | A  * | 5/1997  | Tagawa et al. | 345/104 |
| 7,839,393 | B2 * | 11/2010 | Chang         | 345/174 |
| 8,259,086 | B2 * | 9/2012  | Agari et al.  | 345/173 |
| 8,334,852 | B2 * | 12/2012 | Matsubara     | 345/174 |

(Continued)

FOREIGN PATENT DOCUMENTS

| | | | |
|---|---|---|---|
| KR | 2007-0082965 | A   | 8/2007 |
| KR | 1020070082965 |  *  | 8/2007 |
| KR | 2009-0000484 | A   | 1/2009 |

OTHER PUBLICATIONS

Office Action dated Apr. 19, 2013 from the Korean Intellectual Property Office in counterpart Korean application No. 10-2010-0096105.

(Continued)

*Primary Examiner* — Ariel Balaoing
*Assistant Examiner* — Darlene M Ritchie
(74) *Attorney, Agent, or Firm* — Morgan, Lewis & Bockius LLP

(57) ABSTRACT

A display device having a touch screen panel includes a display panel includes a common electrode; a touch screen panel including a plurality of first conductive patterns that are formed on one surface of the display panel and arranged in a first direction, and a plurality of second conductive patterns that are electrically insulated from the plurality of first conductive patterns and arranged in a second direction to cross over the first conductive patterns; a power source circuitry to supply a first common voltage to the common electrode and to supply a pulse voltage to at least one of the plurality of first and second conductive patterns; and a common voltage feedback circuit to remove an induction voltage induced to the common electrode by the pulse voltage supplied to the at least one of the plurality of first and second conductive patterns.

6 Claims, 5 Drawing Sheets

(56) References Cited

U.S. PATENT DOCUMENTS

| | | |
|---|---|---|
| 8,395,595 B2 * | 3/2013 | Miyamoto et al. ............ 345/173 |
| 2005/0253836 A1 * | 11/2005 | Kim et al. .................... 345/212 |
| 2009/0066670 A1 | 3/2009 | Hotelling et al. |
| 2009/0096757 A1 * | 4/2009 | Hotelling et al. ............ 345/173 |
| 2009/0135158 A1 * | 5/2009 | Takahashi et al. ............ 345/174 |
| 2011/0193817 A1 * | 8/2011 | Byun et al. .................... 345/174 |

OTHER PUBLICATIONS

The First Office Action dated Nov. 21, 2013 from The State Intellectual Property Office of the People's Republic of China in counterpart Chinese application No. 201110305679.1.

* cited by examiner

DISPLAY DEVICE HAVING TOUCH SCREEN PANEL THAT OFFSETS INDUCTION VOLTAGE INDUCED IN COMMON ELECTRODE

This application claims the priority and the benefit of Korea Patent Application No. 10-2010-0096105 filed on Oct. 1, 2010, the entire contents of which is incorporated herein by reference as if fully set forth herein.

BACKGROUND OF THE INVENTION

Field of the Invention

An interface between the display devices and a user is generally configured using various input devices such as a keyboard, a mouse, a trackball, a joystick and a digitizer. However, the user has to learn how to use the input devices and the input device occupies a separate space. As a result, the display device using the separate input devices is inconvenient in view of customer satisfaction. Thus, a demand for simple and convenient input devices capable of reducing a malfunction has been increasing day by day. A touch screen panel, through which the user inputs information by directly contacting the screen of the display device with his or her finger or a pen, was proposed to meet the demand.

The touch screen panel is a simple input device capable of reducing malfunction and can input information without using a separate input device. Further, because the user can easily operate the touch screen panel through the contents displayed on the screen of the touch screen panel, the touch screen panel has been applied to various display devices.

The touch screen panel is a simple input device capable of reducing the malfunction and can input information without using a separate input device. Further, because the user can easily operate the touch screen panel through the contents displayed on the screen of the touch screen panel, the touch screen panel has been applied to various display devices.

Touch screen panels can be classified into a resistive type touch screen panel, a capacitive type touch screen panel, and an electromagnetic type touch screen panel based on a method for sensing a touched portion of the touch screen panel. The resistive type touch screen panel senses the touched portion by a voltage grade depending on a resistance in a state where a DC voltage is applied to a metal electrode formed on an upper substrate or a lower substrate of the resistive type touch screen panel. The capacitive type touch screen panel senses the touched portion by forming an equipotential surface on a conductive layer and sensing a voltage change location of upper and lower substrates of the capacitive type touch screen panel based on a touch operation. The electromagnetic type touch screen panel senses the touched portion by reading an LC value induced by touching a conductive layer with an electronic pen. Also, an optical type or ultrasonic type touch screen panel are known.

In the resistive type touch screen panel, if a user touches an upper substrate of the touch screen panel, a transparent conductive film of the upper substrate contacts a transparent conductive film of a lower substrate of the touch screen panel. The touch screen panel detects a touched position by sensing an electric potential along an x-axis and an electrical potential along a y-axis generated when the transparent conductive films are contacted with each other. In a resistive type touch screen panel, a more exact touch position can be sensed because the touch position is determined by a physical contact. However, an analog digital converter (ADC) is needed because the touch position is indirectly determined by electrical potentials at x and y axes where the touch is performed. Furthermore, it is difficult to sense the touch position if the user touches the touch screen panel lightly.

On the other hand, the capacitive type touch screen panel has matrix type electrode patterns in which first electrode patterns arranged in an x-axis direction are intersected with second electrode patterns arranged in a y-axis direction. In the capacitive type touch screen panel, if the user touches an arbitrary position in the matrix type electrode patterns, an electrostatic capacitance between the first and second electrode patterns is changed. The capacitive type touch screen panel detects the position where the electrostatic capacitance is changed. According to the electrostatic capacitance, an exact touch position can be detected even if the user touches the touch screen panel lightly.

Hereinafter, a related art capacitive type touch screen panel will be described with reference to FIGS. 1 and 2.

FIG. 1 is a drawing illustrating a related art capacitive type touch screen panel, and FIG. 2 is a cross-sectional view illustrating a display device using the touch screen panel shown in FIG. 1.

As shown in FIG. 1, the related art capacitive type touch screen panel 10 includes a plurality of first conductive patterns R1, R2, . . . Rn arranged in a first direction (for example, a row direction), a plurality of second conductive patterns C1, C2, . . . Cm arranged in a second direction (for example, a column direction) intersecting the first direction, a row driver 11 configured to drive the plurality of first conductive patterns R1, R2, . . . Rn, and column driver 12 configured to drive the plurality of second conductive patterns C1, C2, . . . Cm.

The row driver 11 supplies a pulse voltage Vtsp to the plurality of first conductive patterns R1, R2, . . . Rn to scan them. At the scanning operation, the pulse voltage Vtsp is sequentially charged into each of the plurality of first conductive patterns R1, R2, . . . Rn. While any one of the plurality of first conductive patterns R1, R2, . . . Rn is charged with the pulse voltage Vtsp, the row driver 11 supplies a ground voltage GND to others of the first conductive patterns R1, R2, . . . Rn. For example, the row driver 11 supplies a ground voltage GND to the first conductive patterns R1, R2, R4, . . . Rn while the first conductive pattern R3 is charged with the pulse voltage Vtsp as shown in FIG. 1.

The column driver 12 sequentially supplies the pulse voltage Vtsp to the second conductive patterns C1, C2, . . . Cm to scan them after the scanning operation of the plurality of first conductive patterns R1, R2, . . . Rn are completed. At the scanning operation, the pulse voltage Vtsp is sequentially charged into each of the plurality of second conductive patterns C1, C2, . . . Cm. While any one of the plurality of first conductive patterns C1, C2, . . . Cm is charged with the pulse voltage Vtsp, the column driver 12 supplies a ground voltage GND to others of the second conductive patterns C1, C2, . . . Cm. For example, the column driver 12 supplies a ground voltage GND to the second conductive patterns C1, C2, C4, . . . Cm while the second conductive pattern C3 is charged with the pulse voltage Vtsp as shown in FIG. 1.

The touch screen panel 10 shown in FIG. 1 senses a touch position based on a variation of electrostatic capacitance between an initial electrostatic capacitance when the touch screen panel is not touched and a touch electrostatic capacitance when the touch screen panel is touched.

FIG. 2 is a cross-sectional view illustrating a liquid crystal display device 50 using the touch screen panel 10 shown FIG. 1. The liquid crystal display device 50 includes a thin film transistor array substrate 20, a color filter array substrate 30, a liquid crystal layer 40 disposed between the thin film transistor array substrate 20 and the color filter array substrate 30, and the touch screen panel 10 formed on the color filter array substrate 30.

The thin film transistor array substrate 20 includes a thin film transistor array 23 formed on a first substrate 21, and an alignment film 25 formed on the thin film transistor array 23. The thin film transistor array 23 includes gate lines and data lines formed on a first substrate 21 to cross each other, thin film transistors formed in a region where the gate lines and data lines are intersected, and pixel electrodes connected to the thin film transistors, respectively. Each of the pixel electrodes is formed in a unit of a liquid crystal cell defined by the intersection of the gate lines and the data lines. Gate signals and data signals are supplied to the gate lines and data lines via gate and data pads from a gate driving part and a data driving part. The thin film transistors supply the data signals from the data lines to the pixel electrodes response to the gate signals supplied to the gate lines.

The color filter array substrate 30 includes color filters 33 formed on a second substrate 31, a black matrix 35 configured to partition the color filters 33 and reflect light from exterior, a common electrode 37 configured to supply a reference voltage to the liquid crystal cells, and an alignment film 39 formed on the common electrode 37.

Between the thin film transistor array substrate 20 and the color filter array substrate 30, the liquid crystal layer 40 is disposed, and on the color filter array substrate 30, the touch screen panel 10 is formed.

In the liquid crystal display device 50, the pulse voltage Vtsp is sequentially applied to the first conductive patterns R1, R2, ... Rn and second conductive patterns C1, C2, ... Cm to sense a touch applied to the touch screen panel 10. Accordingly, a parasitic capacitance is generated between the first and second conductive patterns R1, R2, ... Rn and C1, C2, ... Cm and the common electrode 37 of the color filter array substrate 30. The parasitic capacitance is obtained according to the following equation.

$$C_{T-V} = \in \in_o A/D$$

In the equation, "$C_{T-V}$" represents the parasitic capacitance generated between the first and second conductive patterns R1, R2, ... Rn and C1, C2, ... Cm and the common electrode 37 of the color filter array substrate 30, "A" represents an area of active region of the touch screen panel, "D" represents a thickness of the second substrate 31 of the color filter array substrate 30, $\in$ represents a relative dielectric constant of the second substrate 31, and $\in_o$ represents a dielectric constant of the second substrate 31 at a vacuum atmosphere.

As mentioned above, the parasitic capacitance is generated between the first and second conductive patterns R1, R2, ... Rn and C1, C2, ... Cm and the common electrode 37 of the color filter array substrate 30 by the pulse voltage Vtsp applied to drive the touch screen panel. However, in the related art touch screen panel, there is a problem that a noise is induced to the common electrode 37 by the parasitic capacitance.

SUMMARY OF THE INVENTION

Accordingly, the present invention is directed to a display device having a touch screen panel that substantially obviates one or more of the problems due to limitations and disadvantages of the related art.

An object of this invention is to provide a display device capable of stabilizing a common voltage applied to the common electrode by offsetting an induction voltage induced in the common electrode by the pulse voltage Vtsp for driving the touch screen panel.

Additional features and advantages of the invention will be set forth in the description which follows, and in part will be apparent from the description, or may be learned by practice of the invention. The objectives and other advantages of this invention will be realized and attained by the structure particularly pointed out in the written description and claims hereof as well as the appended drawings.

To achieve these and other advantages and in accordance with the purpose of this invention, as embodied and broadly described, a display device having a touch screen panel includes a display panel includes a common electrode; a touch screen panel including a plurality of first conductive patterns that are formed on one surface of the display panel and arranged in a first direction, and a plurality of second conductive patterns that are electrically insulated from the plurality of first conductive patterns and arranged in a second direction to cross over the first conductive patterns; a power source circuitry to supply a first common voltage to the common electrode and to supply a pulse voltage to at least one of the plurality of first and second conductive patterns; and a common voltage feedback circuit to remove an induction voltage induced to the common electrode by the pulse voltage supplied to the at least one of the plurality of first and second conductive patterns.

It should be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention. In the drawings.

DETAILED DESCRIPTION OF THE PREFERRED EMBODIMENTS

Figure 1:
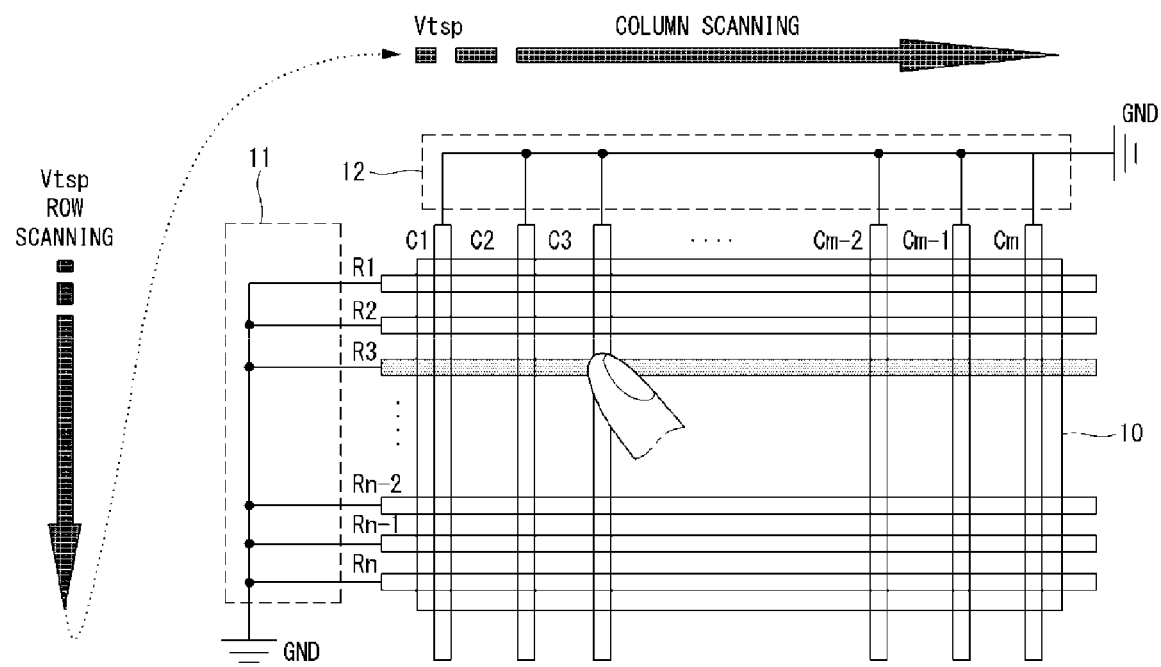
FIG. 1 is a conceptional view illustrating a scanning operation of a related art electrostatic capacitive type touch screen panel.
Figure 2:
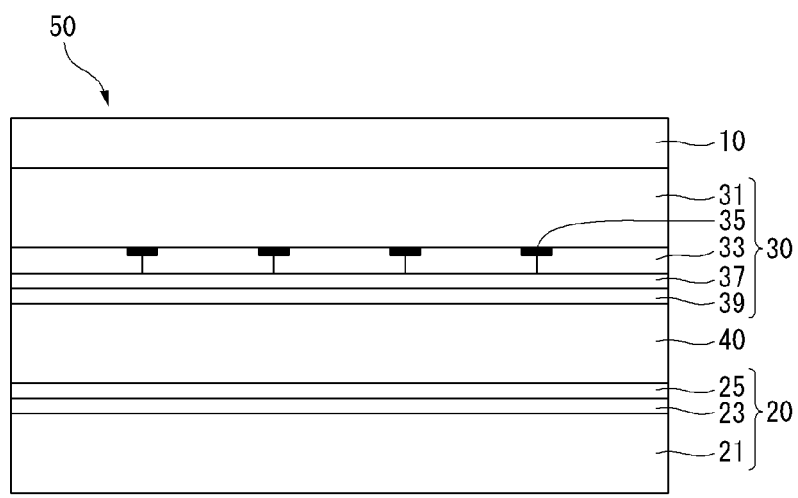
FIG. 2 is a cross-sectional view illustrating a display device having the touch screen panel of FIG. 1.

Hereinafter, example of various embodiments will be described in detail with reference to drawings. Like reference numerals designate like elements throughout the specification.

Figure 3:
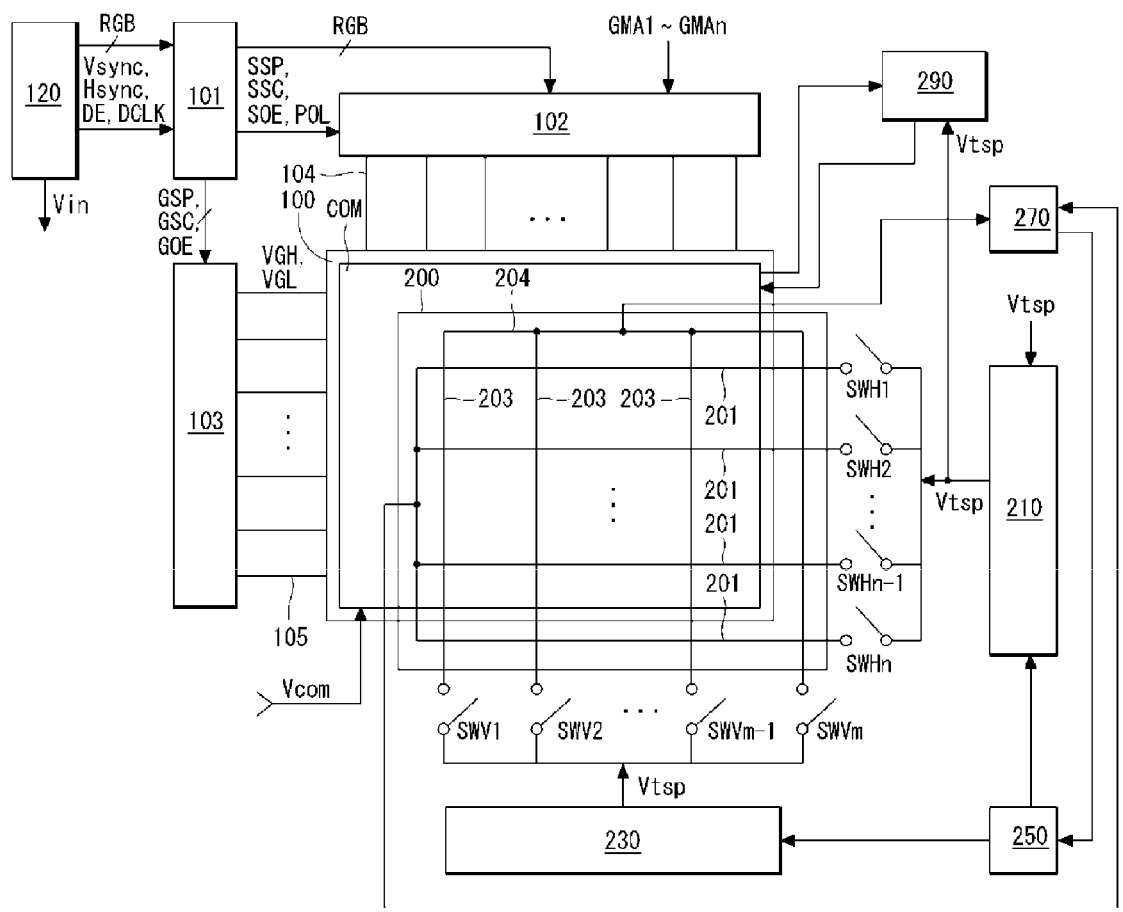
FIG. 3 is a schematic block diagram illustrating a display device having an electrostatic capacitive type touch screen panel according to an exemplary embodiment of the present invention.
Figure 3:
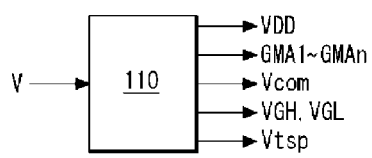
Figure 4:
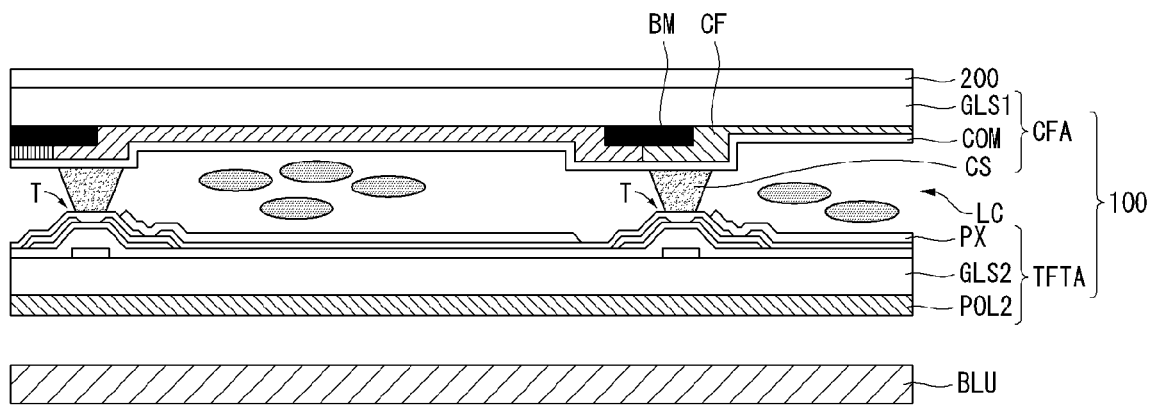
FIG. 4 is cross-sectional view illustrating the display device shown in FIG. 3.
Figure 5:
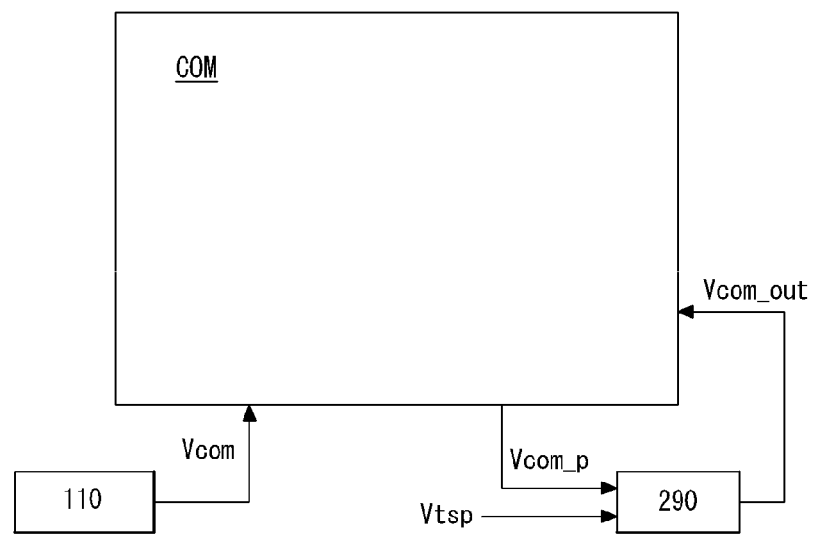
FIG. 5 is a block diagram illustrating a relationship between a common electrode, a common voltage generating circuit and a common voltage feedback circuit shown in FIG. 3.

With reference to FIGS. 3 to 5, a display device according to an exemplary embodiment of the present invention includes a liquid crystal display panel 100 having a color filter array CFA and a thin film transistor array TFTA, a backlight unit BLU, a timing controller 101, a data driving part 102, a gate driving part 103, a power source part 110, a host computer 120, a touch screen panel 200, a first conductive pattern driving circuit 210, a second conductive pattern driving circuit 230, a touch controller 250, a touch perceiving processor 270, and a common voltage feedback circuit 290. The liquid crystal display device includes the color filter array CFA, the thin film transistor array TFTA, a liquid crystal layer LC disposed between the color filter array CFA and the thin film transistor array TFTA, spacers CS to maintain a cell gap of the liquid crystal layer LC.

The color filter array CFA includes color filters CF and a black matrix BM formed on one surface of a first substrate GLS1. The touch screen panel 200 is formed on another surface of the first substrate GLS1. The thin film transistor array TFTA includes gate lines 104 and data lines 105 formed on one surface of a second substrate GLS2 to cross each other, thin film transistors T formed in a region where the gate lines and the data lines are intersected with each other, pixel electrodes PX connected to the thin film transistors T, and a polarization film POL2 formed on another surface of the second substrate GLS2. The common electrode COM is formed on the first substrate GLS1 in a vertical electrical field type driving method such as a twisted nematic (TN) mode and a vertical alignment (VA) mode as shown in FIG. 4, however is formed on the second glass substrate GLS2 together with the pixel electrodes PX in a horizontal electrical field type driving method such as an in-plane switching (IPS) mode and a fringe field switching (FFS) mode.

The backlight unit BLU is disposed under the liquid crystal display panel 100. The backlight unit BLU includes a plurality of light sources to evenly illuminate light to the liquid crystal display panel 100. The backlight unit BLU may be implemented by a direct type or an edge type. The backlight unit includes at least one among HCFL (hot cathode fluorescent lamp), CCFL (cold cathode fluorescent lamp), EEFL (external electrode fluorescent lamp), and LED (light emitting diode) as a light source.

The data driving part 102 samples and latches a digital video data RGB under the timing controller 101. The data driving part 102 converts the latched digital video data into a positive or a negative polarity analog data voltage using a positive or a negative polarity gamma compensating voltage, and outputs the positive or negative polarity analog data voltage to the data lines 104. The positive or negative polarity analog data voltage output from the data driving part 102 is synchronized with the gate pulse signal output from the gate driving part 103. Each of source drive ICs (integrated chips) in the data driving part 102 is connected to the data lines 104 of the liquid crystal display panel 100 by COG (chip-on-glass) process or TAP (tape automated bonding) process. The source drive ICs may be integrated into the timing controller 101 so that they are formed in one chip type.

The gate driving part 103 sequentially outputs gate pulses (or scan pulses) in a display mode under the timing controller 101, and shifts a swing voltage of the gate pulse between a gate high voltage VGH and a gate low voltage. The gate pulses from the gate driving part 103 are sequentially supplied to the gate lines 105 to be synchronized with the data voltage from the data driving part 102. The gate high voltage VGH is more than a threshold voltage of the thin film transistor T, and the gate low voltage VGL is less than the threshold voltage of the thin film transistor T. Gate drive ICs in the gate driving part 103 are connected to the gate lines 105 of the second substrate GLS2 in the liquid crystal display panel 100 by the TAP process. Alternatively, the gate drive ICs in the gate driving part 103 are directly formed on the second substrate GLS2 with the pixels in the liquid crystal display panel 100 by GIP (Gate In Panel) process.

The timing controller 101 generates timing control signals to control operational timings of the data driving part 102 and the gate driving part 103 using timing signals output from a host computer 120. The timing control signals includes data timing control signals for controlling the operational timings of the data driving part 102 and gate timing control signals for controlling the operational timings of the gate driving part 103.

The gate timing control signals include a gate start pulse GSP, a gate shift clock GSC, a gate output enable signal GOE and so on. The gate start pulse GSP is applied to a first gate drive IC which outputs gate pulse at first for each frame period to control a shift start timing of the first gate drive IC. The gate shift clock GSC is a clock signal commonly input to the gate drive ICs of the gate driving part 103 to shift the gate start pulse GSP. The gate output enable signal GOE controls the output timing of the gate drive ICs in the gate driving part 103.

The data timing control signals includes a source start pulse SSP, a source sampling clock SSC, a polarity control signal POL, a source output enable signal SOE and so on. The source start pulse SSP is applied to a first source drive IC which samples data at first in the data driving part 102 to control a data sampling start timing of the first source drive IC. The source sampling clock SSC is clock signal which controls a sampling timing of data in the source drive ICs based on a rising edge or falling edge. The polarity control signal POL controls polarities of data voltages output from the source drive ICs. The source output enable signal SOE controls output timings of the source drive ICs. The source start pulse SSP and the source sampling clock SSC may be omitted if the digital data RGB is input to the data driving part 102 through a mini low voltage differential signaling (mini LVDS) interface.

The power source part 110 includes a pulse width modulation (PWM) circuit, a boost converter, a regulator, a charge pump, a divisional voltage circuit, and a DC-DC converter having an operational amplifier and so on. The power source part 110 regulates input voltages from the host computer 120 and generates voltages necessary for driving the liquid crystal display panel 101, the data driving part 102, the gate driving part 103, the timing controller 101, and the backlight unit BLU. The voltages output from the power source part 110 includes a high potential power source voltage VDD, a gate high voltage VGH, a gate low voltage VGL, a common voltage Vcom, positive/negative gamma reference voltages GMA1 to GMAn and the pulse voltage Vtsp and so on.

The host computer 120 supplies digital video data RGB, and timing signals to the timing controller 101 through the LVDS interface or transition minimized differential signaling (TMDS) interface. The timing signals includes a vertical synchronizing signal Vsync, a horizontal synchronizing signal Hsync, a data enable signal DE and a dot clock signal DCLK necessary for driving the display device.

The touch screen panel 200 includes a plurality of first conductive patterns 201 arranged in parallel with a first direction (for example, an X-axis direction) and a plurality of second conductive patterns 203 arranged in parallel with a second direction (for example, Y-axis direction) to intersect with the first direction, and a insulation layer (or insulation patterns) (not shown) formed at intersection regions of the first and second conductive patterns 201 and 203 so that the first conductive patterns 201 are not contacted with the second conductive patterns 203.

The first conductive pattern driving circuit 210 sequentially supplies the pulse voltage Vtsp from the power source part 110 to the first conductive patterns 201 of the touch screen panel 200 to scan the first conductive patterns 201. The first conductive pattern driving circuit 210 makes the first conductive patterns 201 to which the pulse voltage Vtsp is not applied to be floated. That is, at the floating condition, there is no electrical path between the floated first conductive patterns 201 and the first conductive pattern driving circuit 210. Therefore, no voltage is applied to the floated first conductive patterns 201.

The first conductive pattern driving circuit 210 also includes a plurality of horizontal line control switches SWH1 to SWHn for supplying the pulse voltage Vtsp to the first conductive patterns 201 in response to a scanning control signal from the touch controller 250. Although FIG. 3 shows that the plurality of horizontal line control switches SWH1 to SWHn are disposed between the first conductive pattern driving circuit 210 and the touch screen panel 200, other arrangements can be implemented in accordance with this invention. For example, the plurality of horizontal line control switches SWH1 to SWHn may be incorporated into the first conductive pattern driving circuit 210 or the touch screen panel 200.

The second conductive pattern driving circuit 230 sequentially supplies the pulse voltage Vtsp from the power source part 110 to the second conductive patterns 203 of the touch screen panel 200 to scan the second conductive patterns 203 after the scanning operation of the first conductive patterns 201 is completed. The second conductive patterns 203 to which the pulse voltage Vtsp is not applied are floated. The second conductive pattern driving circuit 230 includes a plurality of vertical line control switches SWV1 to SWVm for supplying the pulse voltage Vtsp to the second conductive patterns 203 in response to a scanning control signal from the touch controller 250. Although FIG. 3 shows that the plurality of vertical line control switches SWV1 to SWVm are disposed between the second conductive pattern driving circuit 230 and the touch screen panel 200, this invention is not limited thereto. For example, the plurality of vertical line control switches SWV1 to SWVn may be incorporated into the second conductive pattern driving circuit 230 or the touch screen panel 200.

The touch controller 250 supplies the scanning control signals to the first and second conductive pattern driving circuits 210 and 230 to drive the touch screen panel 200. In the exemplary embodiment described above, although the touch controller 250 is independently formed, this invention is not limited thereto. For example, the touch controller 250 may be incorporated into the host computer 120.

The touch perceiving processor 270 is connected with the first and second conductive patterns 201 and 203 to differentially amplify initial voltages corresponding to initial electrostatic capacitances of the first and second conductive patterns 201 and 203 when the touch screen panel is not touched and touch voltages corresponding to touch electrostatic capacitances of the first and second conductive patterns 201 and 203 when the touch screen panel is touched, and convert the amplified initial and touch voltages into digital data. Based on a difference between the initial voltage and the touch voltage, the touch perceiving processor 270 determines a touch position of the touch screen panel by using a touch perceiving algorithm, and outputs a touch coordinate data indicating the touch position to the touch controller 250.

The common voltage feedback circuit 290 receives the pulse voltage Vtsp supplied from the power source part 110 via the first conductive pattern driving circuit 210, and also receives a present common voltage from the common electrode COM. Hereinafter, a voltage supplied from the power source part 110 to the common electrode COM is referred to as a first common voltage Vcom, the present common voltage supplied from the common electrode COM to the common voltage feedback circuit 290 is referred to as a second common voltage Vcom_p, and a feedback voltage supplied to the common electrode COM through the common voltage is referred to as a third common voltage Vcom_out.

In the above-mentioned embodiment, the common voltage feedback circuit 290 receives the pulse voltage Vtsp supplied from the power source 110 through the first conductive pattern driving circuit 210. However, this invention is not limited thereto. For example, the common voltage feedback circuit 290 may receives the pulse voltage Vtsp supplied from the power source 110 through the second conductive pattern driving circuit 230. Otherwise, the common voltage feedback circuit 290 may receives the pulse voltage Vtsp supplied from the power source 110 through both the first and the second conductive pattern driving circuits 210 and 230.

Figure 6:
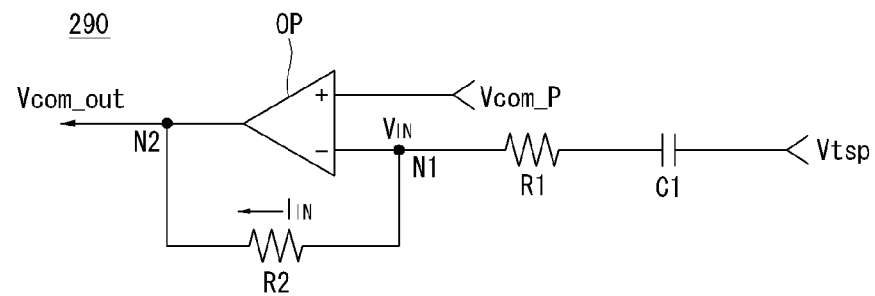
FIG. 6 is a circuit diagram of the common voltage feedback circuit shown in FIG. 5.

The common voltage feedback circuit 290 is implemented by a differential circuit as shown in FIG. 6. The common voltage feedback circuit 290 includes a capacitor C1 and a first resistor R1 connected in serial between an output terminal of the first conductive pattern driving circuit 210 and a first node N1. The common voltage feedback circuit 290 also includes an operational amplifier OP having a non-inversion terminal + for receiving the second common voltage Vcomp from the common electrode COM, an inversion terminal connected to the first node N1, and an output terminal. The common voltage feedback circuit 290 also includes a second resistor R2 connected between the first node N1 and a second node N2 which is connected to the output terminal of the operational amplifier OP.

In the display device having the touch screen panel, a parasitic capacitance is generated between the common electrode COM and the first and second conductive patterns 201 and 203 when the touch screen panel is touched and operated. Accordingly, a noise having the same frequency as the pulse voltage Vtsp is induced to the common electrode COM.

The common voltage feedback circuit 290 is implemented by the differential circuit using the operational amplifier OP. The common voltage feedback circuit 290 generates the third common voltage Vcom_out which removes a noise component from the second voltage Vcom_p.

Hereinafter, will be described with reference to FIG. 6. The first resistor R1 and the capacitor C1 functions as a low pass filter to reduce high frequency gain of the pulse voltage Vtsp supplied from the first conductive pattern driving circuit 210 or the second conductive pattern driving circuit 230 and output it as a voltage Vin. The voltage Vin is obtained from the following equation 1.

$$V_{IN} = I_{IN}\left(R_1 + \frac{1}{C_1}\right)t \quad \text{[Equation 1]}$$

It is possible to obtain current $I_{IN}$ flowing through the first node N1 according to equation 2 obtained from the equation 1.

$$I_{IN} = \frac{V_{IN}}{t}\left(\frac{1}{R_1 + \frac{1}{C_1}}\right) = \frac{V_{IN}}{t}\left(\frac{C_1}{1 + R_1 C_1}\right) \qquad \text{[Equation 2]}$$

It is possible to obtain the third common voltage Vcom_out from the common voltage feedback circuit 290 according to equation 3 because the current $I_{IN}$ flows through the second resistor R2.

$$\text{Vcom\_out} = I_{IN} R_2 = -\left(\frac{V_{IN}}{t}\right)\left(\frac{C_1 R_2}{1 + R_1 C_1}\right) \qquad \text{[Equation 3]}$$

In the equations 1 to 3, $V_{IN}$ represents a voltage of which a high frequency gain is reduced from the pulse voltage Vtsp supplied from the first conductive pattern driving circuit 210 or the second conductive pattern driving circuit 230. Also, C1 represents capacitance of the capacitor C1, R1 represents resistance of the first resistor R1, R2 represents resistance of the second resistor R2, $I_{IN}$ represents current flowing through the second resistor R2, and Vcom_out represents the third common voltage output from the common voltage feedback circuit 290.

Figure 7:
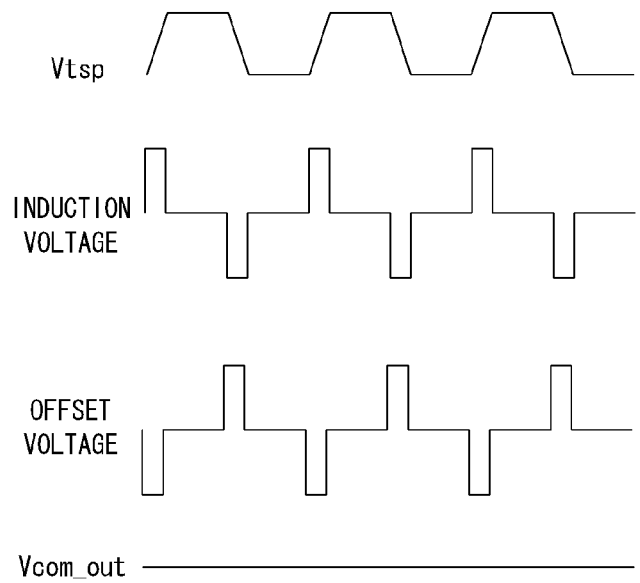
FIG. 7 is waveform diagrams illustrating waveforms of input and output signals supplied to the common voltage feedback circuit.

FIG. 7 are waveform diagrams illustrating a waveform of the pulse voltage Vtsp supplied to the common voltage feedback circuit 290, a waveform of an induction voltage induced to the common electrode COM by the pulse voltage Vtsp, a waveform of an offset voltage canceling the induction voltage by the operational amplifier OP of the common voltage feedback circuit 290, and a waveform of the third common voltage Vcom_out output from the common voltage feedback circuit 290. Although a parasitic capacitance is generated by the common electrode COM and the first and second conductive patterns 201 and 203 of the touch screen panel 200, as known from the waveform diagrams of FIG. 7, it is possible to supply a stable output voltage to the common electrode COM because the third common voltage Vcom_out supplied to the common electrode COM has not an induction voltage component.

FIG. 7 is waveform diagrams illustrating a waveform of the pulse voltage Vtsp supplied to the common voltage feedback circuit 290, a waveform of an induction voltage induced to the common electrode COM by the pulse voltage Vtsp, a waveform of an offset voltage canceling the induction voltage by the operation amplifier OP of the common voltage feedback circuit 290, and a waveform of the third common voltage Vcom_out output from the common voltage feedback circuit 290. Although a parasitic capacitance is generated by the common electrode COM and the first and second conductive patterns 201 and 203 of the touch screen panel 200, as known from the waveform diagrams of FIG. 7, it is possible to supply a stable output voltage to the common electrode COM because the third common voltage Vcom_out supplied to the common electrode COM has not the induction voltage component.

According to the exemplary embodiments described herein, a display device having a touch screen panel can stabilize the output voltage supplied to the common electrode by canceling the induction voltage induced to the common electrode COM due to the pulse voltage Vtsp using the offset voltage.

In the above-mentioned embodiments, although the liquid crystal display device having a touch screen panel is described as one example, the present invention is not limited thereto. For example, the invention may be applied to a display device including a liquid crystal display (LCD), a field emission display (FED), an electroluminescence device (EL), an electrophoretic display (EPD), etc, if they have a common electrode.

It will be apparent to those skilled in the art that various modifications and variations can be made in the display device having a touch screen panel of the present invention without departing from the spirit or scope of the invention. Thus, it is intended that the present invention cover the modifications and variations of this invention provided they come within the scope of the appended claims and their equivalents.

What is claimed is:

1. A display device having a touch screen panel, comprising:
   a display panel comprising a common electrode and a pixel electrode that apply electric field to a liquid crystal layer;
   a touch screen panel comprising:
      a plurality of first conductive patterns on one surface of the display panel and arranged in a first direction; and
      a plurality of second conductive patterns electrically insulated from the plurality of first conductive patterns and arranged in a second direction to cross over the first conductive patterns;
   a power source circuitry configured to:
      supply a first common voltage to the common electrode; and
      supply a pulse voltage to the plurality of first and second conductive patterns; and
   a common voltage feedback circuit comprising:
      a capacitor configured to receive the pulse voltage supplied to the plurality of first and second conductive patterns;
      a first resistor connected to the capacitor in series;
      an operational amplifier comprising:
         a non-inversion input terminal configured to receive a second common voltage comprising an induction voltage induced to the common electrode, the induction voltage comprising the first common voltage combined with a pulse waveform based on a parasitic capacitance between the common electrode and the first and second conductive patterns;
         an inversion input terminal connected to the first resistor and configured to receive the pulse voltage via the capacitor and the first resistor; and
         an output terminal configured to output a third common voltage to remove an induction voltage induced to the common electrode by the pulse voltage supplied to the plurality of first and second conductive patterns; and
      a second resistor connected between the non-inversion input terminal and the output terminal of the operational amplifier,
   wherein the common voltage feedback circuit is configured to:
      receive the pulse voltage and the second common voltage including the induction voltage from the common electrode, and
      supply the third common voltage to the common electrode to remove the induction voltage.

2. The display device of claim 1, wherein:
an output voltage of the common voltage feedback circuit is determined based according to the equation:

$$\text{Vcom\_out} = I_{IN} R_2 = -\left(\frac{V_{IN}}{t}\right)\left(\frac{C_1 R_2}{1 + R_1 C_1}\right); \text{ and}$$

wherein:
- $V_{IN}$ represents the pulse voltage in which the high frequency gain is reduced, $C_1$ represents capacitance of the capacitor;
- $R_1$ represents resistance of the first resistor;
- $R_2$ represents resistance of the second resistor, $I_{IN}$ represents current flowing through the second resistor; and
- Vcom out represents the output voltage output from the differential circuit to the common electrode.

3. The display device of claim 1, further comprising:
a data driver configured to supply a video data voltage to data lines of the display panel;
a gate driver configured to supply a gate pulse voltage synchronized with the data voltage to gate lines of the display panel; and
a timing controller configured to generate timing control signals to control operational timing of the data driver and the gate driver.

4. The display device of claim 1, further comprising:
a first conductive pattern driving portion configured to sequentially supply the pulse voltage to the plurality of first conductive patterns to scan the plurality of first conductive patterns; and
a second conductive pattern driving portion configured to sequentially supply the pulse voltage to the plurality of second conductive patterns to scan the plurality of second conductive patterns after the scanning of the first conductive patterns are completed.

5. The display device of claim 4, further comprising:
a touch controller configured to:
generate a plurality of scanning control signals for controlling the first and second conductive pattern driving portions; and
supply the plurality of scanning control signals to the first and second conductive pattern driving portions; and
a touch perceiving processor connected to the first and second conductive patterns and configured to:
compare a first capacitance of each of the first and second conductive patterns when a touch is not performed with a second capacitance when a touch is performed whenever the pulse voltage is supplied to the first and second conductive patterns; and
output a touch perceiving signal indicating whether or not a touch is performed to the touch controller.

6. The display device of claim 4, wherein the power source circuitry is configured to:
supply the voltage pulse to the common voltage feedback circuit directly; or
supply the pulse voltage to the common voltage feedback circuitry through any one of the first and second conductive pattern driving portions.

* * * * *